March 9, 1965 A. V. MANDEKIC 3,172,685
TRAILER STEERING MECHANISM
Filed Dec. 14, 1962 6 Sheets-Sheet 1
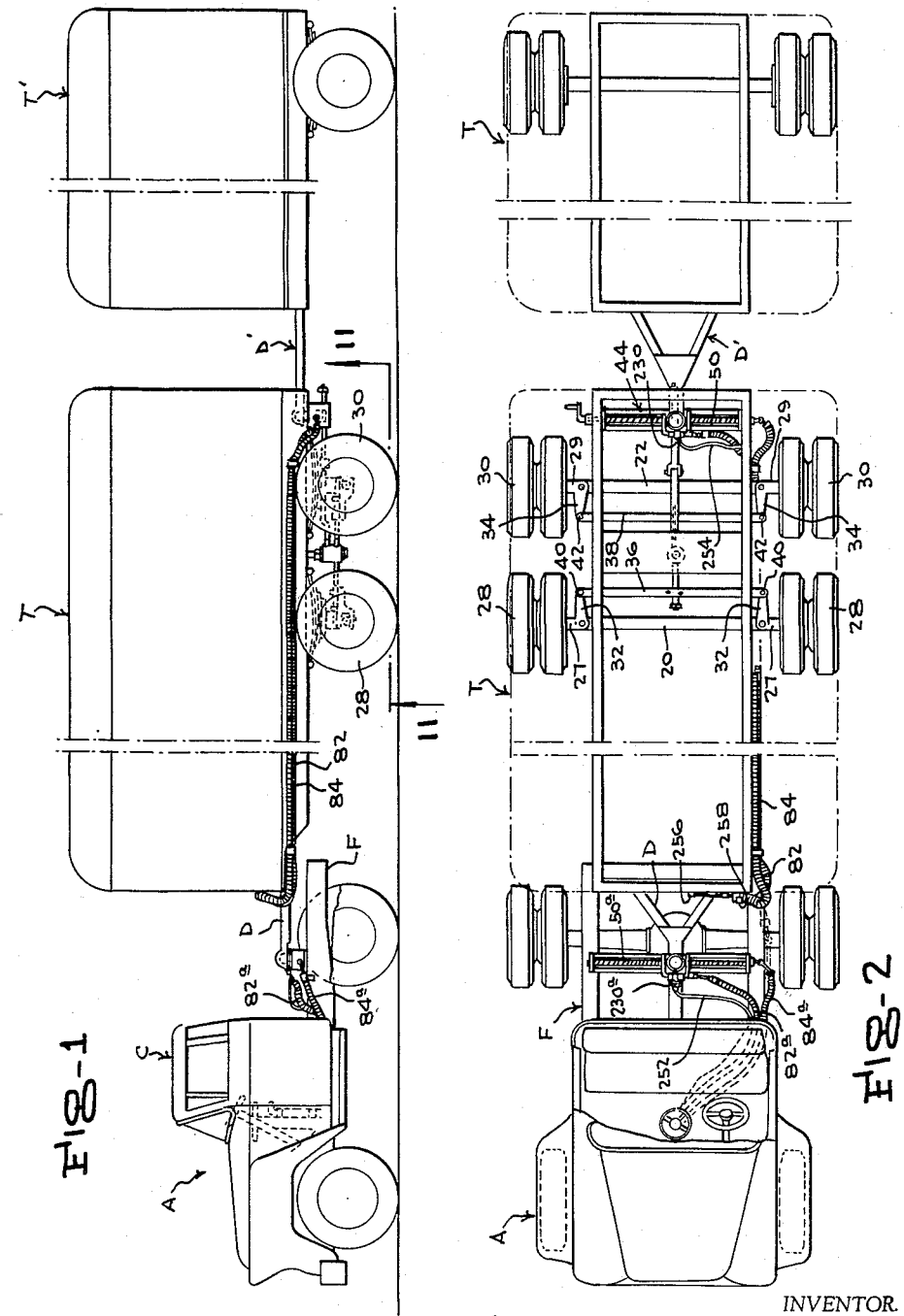
INVENTOR.
ANTHONY V. MANDEKIC
BY
McMorrow, Berman + Davidson
ATTORNEYS

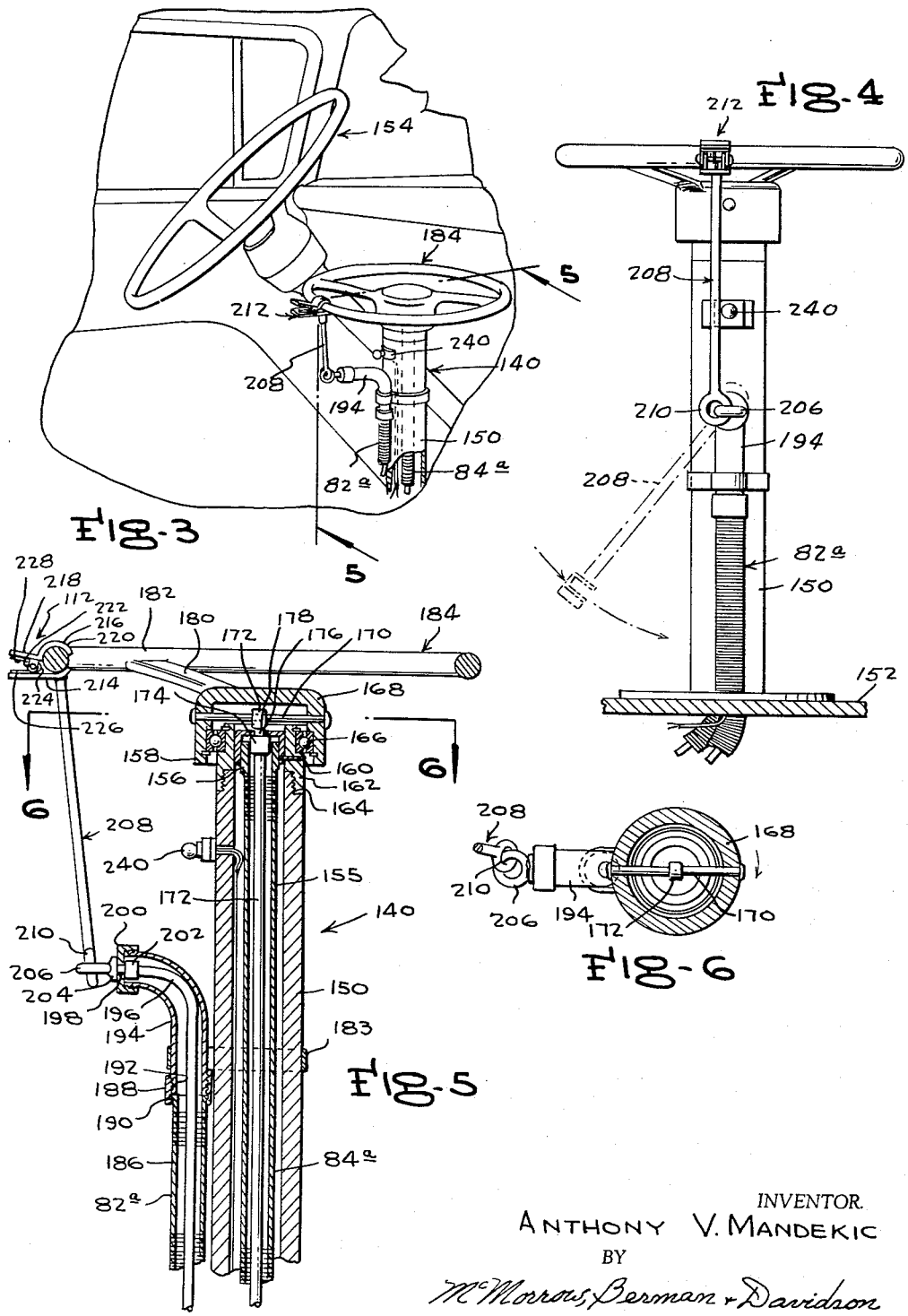

March 9, 1965 A. V. MANDEKIC 3,172,685
TRAILER STEERING MECHANISM
Filed Dec. 14, 1962 6 Sheets-Sheet 3
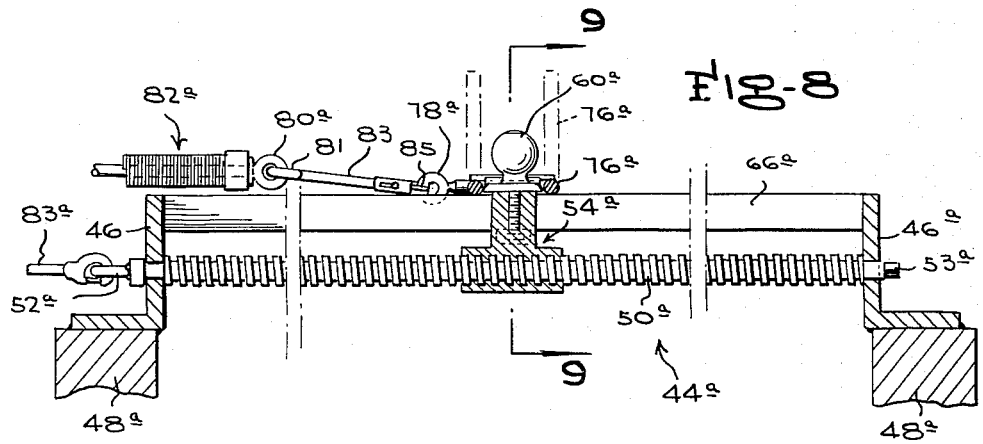
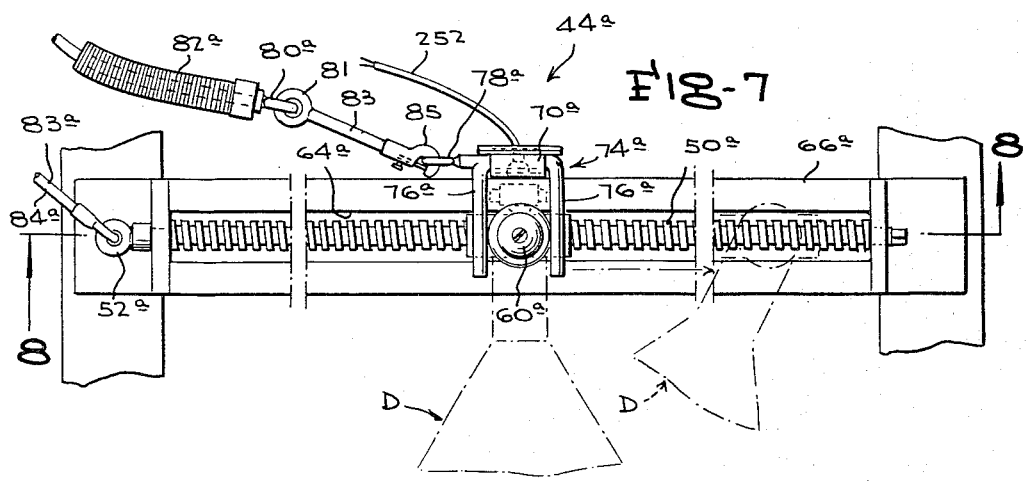
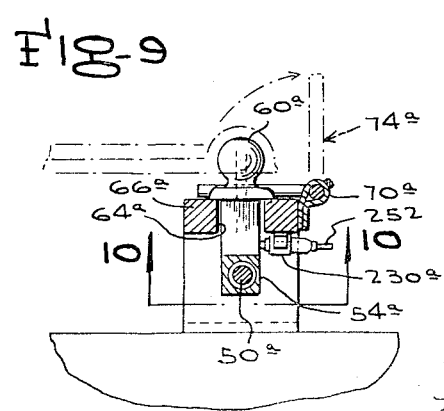
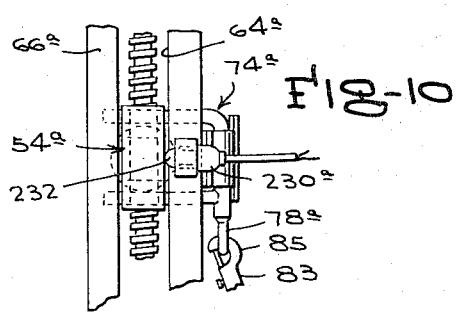
INVENTOR.
ANTHONY V. MANDEKIC
BY
McMorrow, Berman & Davidson
ATTORNEYS

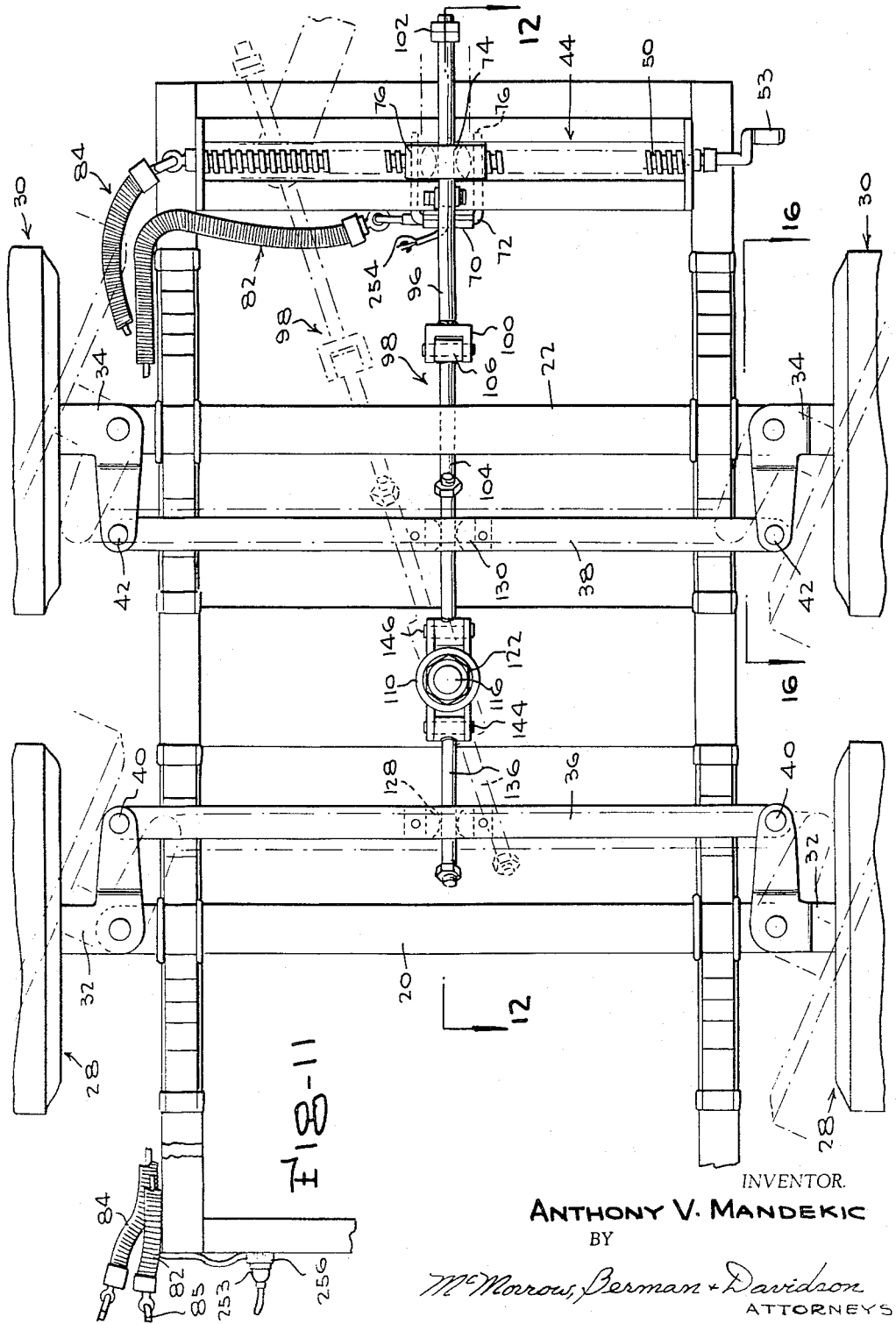

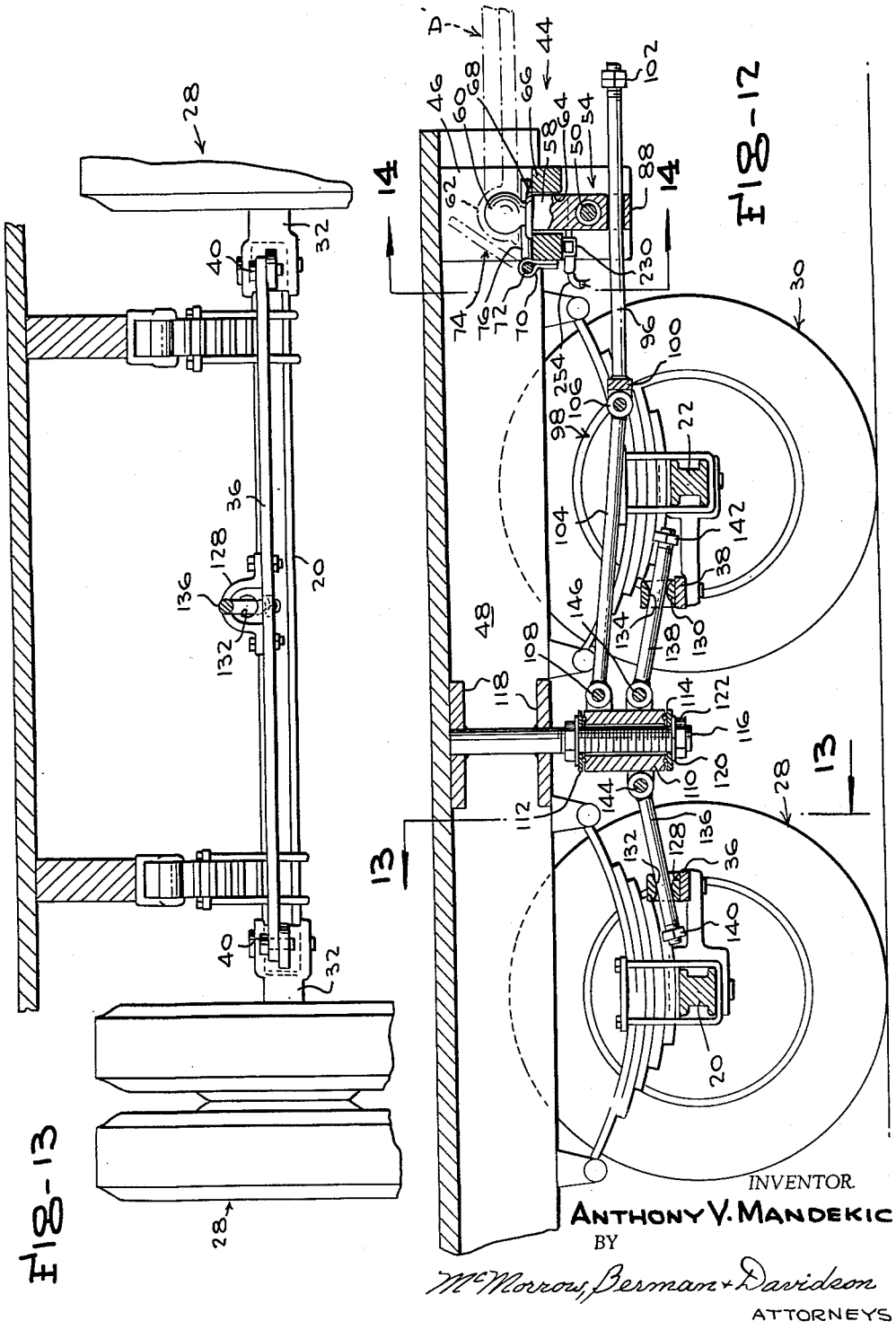

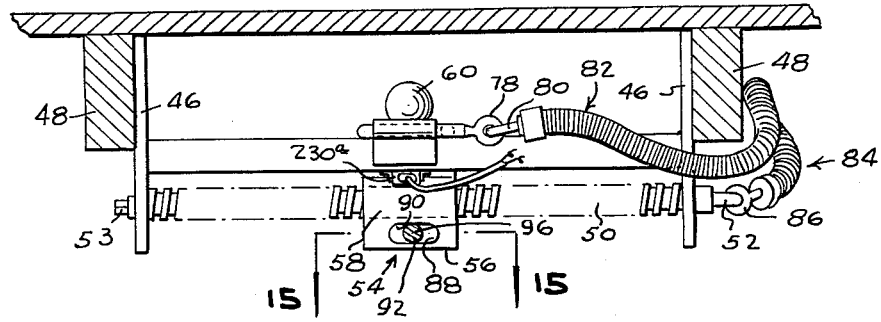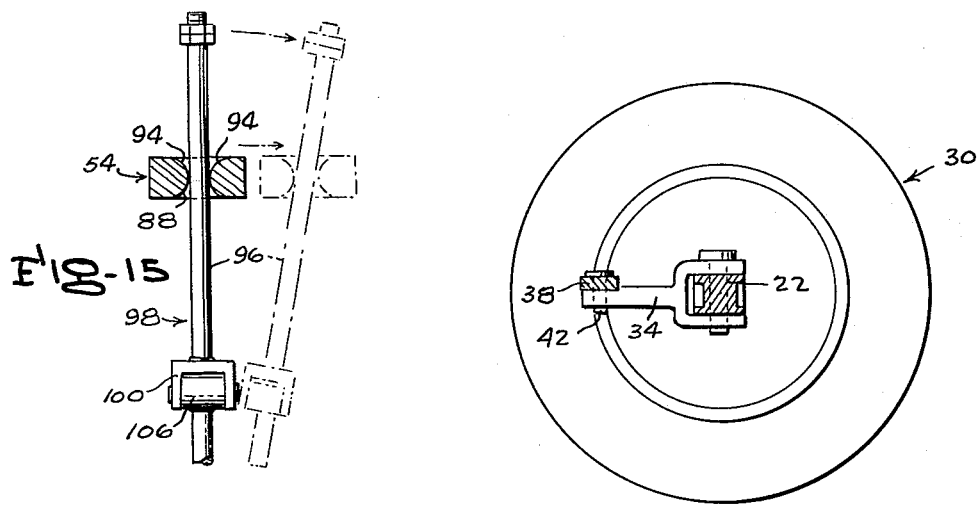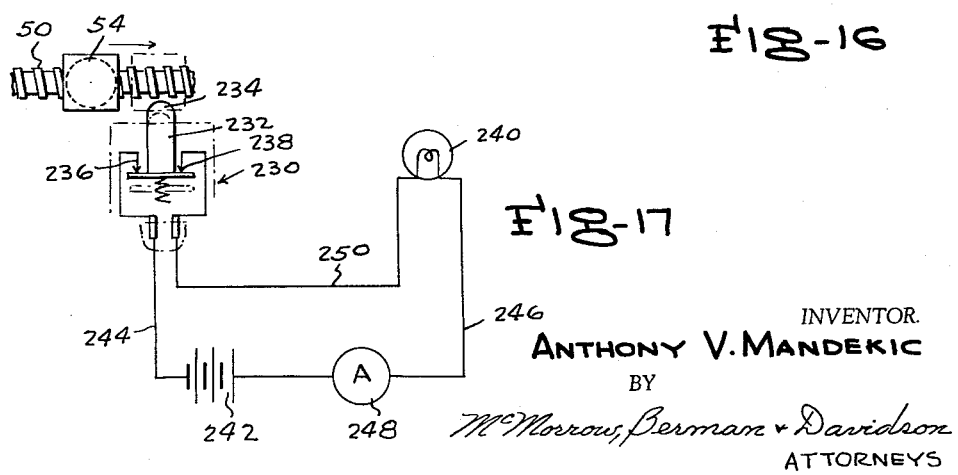

United States Patent Office 3,172,685
Patented Mar. 9, 1965

3,172,685
TRAILER STEERING MECHANISM
Anthony V. Mandekic, 1549 Rendall Place,
Los Angeles, Calif.
Filed Dec. 14, 1962, Ser. No. 244,764
8 Claims. (Cl. 280—408)

This invention relates to novel manually operated, mechanical steering mechanism for trailers and semi-trailers.

The primary object of the invention is the provision of generally improved mechanism of the kind indicated, which is designed to be operated by the driver of a tractor for changing the pivotal centers of the drawbars of and for turning the wheels of single or double-axle semi-trailers and trailers, connected singly to the tractor or in tandem, in the directions of turns made by the tractor, to degrees deemed necessary by the driver to make the semi-trailer and/or trailer follow in the path of the tractor, and thereby avoid crowding or colliding with vehicles in the other or left-hand lane of a highway or street, and avoid dangerous and damaging contact with or the the climbing of curbs by the wheels of the semi-trailer and/or trailer; and to facilitate backing the semi-trailer and/or trailer into parking and other places.

Another object of the invention is the provision of simple, reliable, and easily operated mechanism of the character indicated above, which has driver-operated means for locking the wheels of the trailer or trailers in centered or straight forward positions and for locking the trailer wheel steering means against movements out of positions corresponding to centered positions of these wheels.

A further object of the invention is the provision, in mechanism of the character indicated above, of indicating means for the driver of the tractor, which serves to positively show to the driver whether or not the trailer wheels are centered.

Other important objects and advantageous features of the invention will be apparent from the following description and the accompanying drawings, wherein, for purposes of illustration only, a specific form of the invention is set forth in detail.

In the drawings:

FIGURE 1 is a longitudinally contracted and fragmentary left-hand side elevation, showing a semi-trailer hitched to a tractor and a trailer hitched to the semi-trailer, and mechanism of the present invention associated with the tractor and the semi-trailer;

FIGURE 2 is a top plan view of FIGURE 1;

FIGURE 3 is a fragmentary schematic perspective view of the tractor's cab, showing the tractor steering wheel, a driver-operated trailer wheel steering wheel and associated driver-operated means for locking the trailer wheel steering wheel and the trailer wheels in centered positions, parts being broken away and in section;

FIGURE 4 is a fragmentary sectional and rear elevational view of the tractor wheel steering wheel and the locking means, the latter being shown in engaged position, in full lines, and in disengaged and rotated position, in phantom lines;

FIGURE 5 is a further enlarged and fragmentary vertical longitudinal section taken on the line 5—5 of FIGURE 3;

FIGURE 6 is a horizontal section taken on the line 6—6 of FIGURE 5;

FIGURE 7 is a fragmentary top plan view of a tractor carried trailer wheel steering assembly, showing the traveller nut in centered position, in full lines, and in an operated position, in phantom lines, and locking means locking the traveller nut in centered position;

FIGURE 8 is a vertical longitudinal section taken on the line 8—8 of FIGURE 7; and showing the locking means engaged, in full lines, and disengaged, in phantom lines;

FIGURE 9 is a transverse vertical section taken on the line 9—9 of FIGURE 8, showing the locking means engaged, in full lines, and disengaged, in phantom lines;

FIGURE 10 is a fragmentary bottom plan view taken on the line 10—10 of FIGURE 9;

FIGURE 11 is a fragmentary bottom plan view taken on the line 11—11 of FIGURE 1;

FIGURE 12 is a fragmentary vertical longitudinal section, taken on the line 12—12 of FIGURE 11, and showing the locking means of a steering assembly engaged, in full lines, and disengaged, in phantom lines;

FIGURE 13 is a fragmentary vertical transverse section taken on the line 13—13 of FIGURE 12;

FIGURE 14 is a transverse vertical section taken on the line 14—14 of FIGURE 12, showing a trailer carried steering assembly, with its locking means in engaged position;

FIGURE 15 is a fragmentary horizontal section, taken on the line 15—15 of FIGURE 14, and showing members of a trailer steering assembly in normal position, in full lines, and in steered positions, in phantom lines;

FIGURE 16 is a vertical longitudinal section taken on the line 16—16 of FIGURE 11; and, FIGURE 17 is a schematic view, showing a wiring diagram for the indicating means and a closed position of the switch for engaging the same, the actuator of the switch being out of operative engagement with a traveller nut.

Referring in detail to the drawings, wherein like numerals designate like parts throughout the several views, a tractor A is shown which has a driver's cab C on a chassis frame F which extends behind the cab, a semi-trailer T having a drawbar D connected to the chassis frame F, and a trailer T' having a drawbar D' connected to the semi-trailer T. The semi-trailer T is shown as having longitudinally spaced forward and rear axles 20 and 22, respectively, on the ends of which are journalled, as indicated at 24 and 26, respectively, front and rear steering knuckles 27 and 29, respectively, carrying front and rear wheels 28 and 30, respectively, the steering knuckles, including forwardly extending forward steering arms 32 and forwardly extending steering arms 34, respectively.

The steering arms 32 and 34 have transverse drag links 36 and 38, respectively, extending therebetween and pivoted, at their ends thereto, as indicated at 40 and 42, respectively, which are adapted to be moved endwise, in either direction, simultaneously and to the same degree, by means of a steering assembly 44, located behind the rear axle 22.

The steering assembly 44 comprises, as shown in FIGURES 11 through 14, pendant vertical brackets 46 fixed to side members 48 of the semi-trailer chassis, between and through which a screw 50 is journalled, against endwise movements. The screw 50 terminates, at one end thereof, in an eye 52, and at its other end, in a hand crank 53. A traveller nut 54 is of inverted T-shaped form, comprising a crosshead 56 having a threaded bore 58, extending therethrough, through which the screw 50 is threaded, and an upstanding standard 58, having a hitch ball 60, on its upper end, over which the socket 62 of the hitch drawbar D' of the trailer T' is adapted to be securably engaged. The standard 58 extends upwardly through a longitudinal slot 64, provided in a cross bar 66, which extends between the brackets 46, whereby the traveller nut 54 is prevented from rotating, while being free to move along the slot 64, by rotation of the screw 50. A lateral annular flange 68, below the hitch ball 60, bears upon the upper surface of the cross bar 66.

Fixed on the forward side of the cross bar 66, at the middle thereof, is a journal 70 through which is journalled the bight portion 72 of a pivoted U-shaped lock 74, having parallel spaced legs 76. In the depressed horizontal position of the lock 74, the legs 76 engage the opposite sides of the standard 58, and positively prevent the traveller nut 54 from being moved out of a centered position, corresponding to centered or straight forward positions of the semi-trailer wheels 28 and 30. When the lock 74 is pivoted upwardly, as indicated in phantom lines, in FIGURE 12, the nut 54 is free to travel, in either direction, along the screw 50. The lock 74 has, on one of its legs 76, a lateral eye 78, through which is non-rotatably engaged, an eye 80 on the adjacent end of a Bowden wire 82, which leads forwardly along an adjacent chassis frame side member 48. A Bowden wire 84 has an eye 86, on its rear end, which is non-rotatably engaged through the eye 52 on the adjacent end of the screw 50.

The cross head 56 of the traveller nut 50 is formed, on a level below the threaded bore 58, with an opening 88 opening forwardly and rearwardly therethrough, which has flat upper and lower walls 90 and 92, respectively, and opposed convex side walls 94, and a horizontal, cylindrical cross section rear section 96 of a sectional steering bar 98, extends slidably and rockably through the opening 88 and forwardly beyond the cross bar 66, to a point short of the rear axle 22, where it terminates in a clevis 100. On its rear end, the section 96 has stop-nut means 102.

As shown in FIGURES 11 to 13, the steering bar 98 has a forward section 104 which has a crosshead 106, on its rear end, which is positioned between the arms of the clevis 100 and journalled thereon, whereby the forward section 104 is non-rotatably but pivotally connected to the rear section 96. The forward section 104, as shown in FIGURE 12, is horizontally pivoted, as indicated at 108, to the rear upper part of a vertical centering sleeve 110, which is journalled, by means of upper and lower antifriction bearings 112 and 114, respectively, on the lower part of a perpendicular stubshaft 116 which is centered between the semi-trailer chassis side members, and between the front and rear axles 20 and 22, respectively. The stubshaft 116 is fixed to and extends downwardly below vertically spaced cross bars 118 which extend between and are affixed to the chassis side members 48. The sleeve 110 is held up in place on the stubshaft 116 by means of a washer 120, engaged with the lower bearing 114, underlaid by a nut 122 threaded on the lower end of the stubshaft.

The drag links 36 and 38 have mounted thereon and centered between their ends, upstanding forward and rear guides 128 and 130, respectively. These guides are similar blocks which are formed with forwardly and rearwardly extending openings 132 and 134, respectively, which are similar to the opening 88 of the traveller nut 50. Straight forward and rear guide rods 136 and 138 extend slidably and rockably through the openings 132 and 134, respectively, and have stop-nut means 140 and 142, on the ends which are at the sides of the guides remote from the sleeve 110. The other ends of the guide rods 136 and 138 are severally and horizontally pivoted to related sides of the lower part of the sleeve 110, as indicated at 144 and 146, respectively.

In operation, as the traveller nut 50 is moved to either side of centered position, the lock 74 having first been released, by rotation of the Bowden cable 84, the steering bar 98 pivots, on the axes of the sleeve 110 and the stubshaft 116, as indicated in phantom lines in FIGURE 11, so that the sleeve 110 is rotated, on the stubshaft 116, in a corresponding direction. This rotation of the sleeve 110 swings the guide rods 136 and 138, in opposite directions, whereby the drag links 36 and 38 are moved endwise in opposite directions, and produce turning of the front and rear semi-trailer wheels 28 and 30, to the same side of the semi-trailer T', to the same degree, as shown in phantom lines in FIGURE 11, while at the same time moving the drawbar D' of the trailer T' to the same side.

A tractor carried steering assembly 44a, as shown in FIGURES 8 through 10, is generally similar to the semi-trailer steering assembly 44, except for the absence of a steering bar 98 connected thereto, and is mounted on and extends between the side members 48a of the tractor chassis frame F. The assembly 44a comprises upstanding brackets 46a fixed upon the side members 48a, carrying a screw 50a, on which is threaded a traveller nut 54a, whose standard extends upwardly through a longitudinal slot 64a in a cross member 66a, fixed to the brackets 46a above the screw 50a. The traveller nut has a hitch ball 60a on the upper end of its standard, over which the socket 62a of the drawbar D of the semi-trailer T is securably engaged. A Bowden wire 84a is connected by an eye 86 through an eye 52a, on one end of the screw 50a, and the other end of the screw has a squared terminal 55a for a crank handle 53a.

A U-shaped lock 74a is journalled through a journal 70a fixed on the forward side of the traveller nut 54a and has rearwardly extending legs 76a for embracing and holding the nut, in the centered position thereof. A Bowden wire 82a has an eye 80a engaged through an eye 81, on the adjacent end of a link 83, having an eye 85 on its other end, engaged through a lateral eye 78a on one of the lock legs 76a, the link eye 85 being in the form of a snaphook, as shown in FIGURE 7.

The Bowden wires 82a and 84a lead forwardly from the steering assembly 44a, and enter the tractor cab C, as shown in FIGURES 3 to 6. A trailer wheel steering wheel assembly 140, comprises an upright tubular steering column 150, fixedly mounted on the floor 152 within the cab C, alongside of and on a level below the tractor steering wheel 154, and up into which the Bowden wire 84a leads. The upper end of the flexible shield 155 of the wire 84a has a ferrule 156 thereon, which is inserted upwardly into a cap 158, fitting the bore of the column 150 and secured in place, as by means of screws 160 threaded through a sleeve 162, which is threaded onto the upper end of the column, as indicated at 164. The sleeve 162 carries an external annular bearing 166, which securably journals to the sleeve an inverted pan-shaped hub 168. A cross pin 170 extends across the hub 168, to which the upper end of the wire element 172 of the wire 84a is fixed, as indicated at 172, the wire element 172 having an enlargement 174 below the web of the hub 168, and a reduced portion 176 extending through a hole 178 in the web. Spokes 180 radiate from the hub 168 and have fixed, at their outer ends, the rim 182 of a steering wheel 184. Rotation of the steering wheel 184 rotates the Bowden wire 84a, and hence the screw 50a for moving the traveller nut 54a, in either direction away from its centered position, so as to correspondingly shift the pivotal axis of the semi-trailer drawbar D in the same directions.

The Bowden wire 82a has a tubular shield 186 which extends up to a coupling 188, which securably receives an external bead 190 on the upper end of the shield, and is threaded, as indicated at 192, onto the lower end of a tubular gooseneck 194, which is mounted, by a clamp 183, to the rear side of the steering column 150, on a level spaced below the steering wheel 184, and reaches rearwardly. The wire element 196 of the Bowden wire 82a extends upwardly through the gooseneck 194 and through a hole 198 in the web of a cap 200, which is threaded on the upper end of the gooseneck. An enlargement 202 on the wire element, bears against the inner side of the cap web, and has a flange 204 bearing against the outer side thereof, and the wire element terminates in an eye 206. A lever 208 has an eye 210, on its normally lower end, which is engaged through the eye 206, and carries a clamp 212, on its other end.

The clamp 212 comprises a straight stationary lower jaw 214, fixed on the uuper end of the lever, and a movable upper jaw 216, which has a straight outer handle portion 218 and an arcuate inner position 220, of a diameter to snugly and comfortably embrace the steering wheel rim 182. The jaws 214 and 216 are spaced and pivoted together, as indicated at 222, and a clamping spring has a coil 224, superimposed on the pivot 222, and divergently tensioning legs 226 and 228, which bear against the facing sides of the stationary jaw 214 and the handle portion 218 of the movable jaw.

The clamp 212 is adapted to be clamped on the steering wheel rim 182, only while, and for the purpose of maintaining the traveller nut 54, and hence the trailer wheels, in their centered positions, and the locks 74 and 74a embrace and hold the related traveller nuts in centered positions on their screws 50 and 50a.

The clamp 212 is released from the steering wheel rim 182 only when it is desired to free the steering wheel 184 to be rotated by the driver of the tractor A to move the traveller nut 54a out of centered positions, to either side thereof, and to release the lock from the traveller nut for shifting the axis of the drawbar D of the semi-trailer T. The Bowden wires 82 and 84 have snaphooks 83 and 85, on their forward ends, which are adapted to be snapped into the eyes on the end of the screw 50a of the tractor steering assembly 44a, when it is desired to have the wheels 28 and 30 of the semi-trailer T turned by the operation of the semi-trailer steering assembly 44, as a result of the driver's operation of the tractor steering assembly 44a. The locks 74 and 74a are thereby elevated out of locking positions, by rotating the Bowden wires 82 and 82a, in the proper direction, by swinging the lever 208 downwardly, the clamp 212 having been released from the steering wheel rim 182, and rotating the lever 208.

Means for visually indicating to the driver within the the tractor cab C, whether or not the traveller nuts 54 and 54a, and hence the trailer wheels are in centered or straight forward positions, comprises switches 230a and 230, severally mounted to the undersides of the cross bar 66a of the tractor steering assembly 44a and the semi-trailer steering assembly 44, at the midpoints thereof, and having spring-pressed actuators 232 having rounded noses 234, which can bear against the screws 50a and 50, wherein, as shown in FIGURE 17, the actuators bridge contacts 236 and 238 and can be cammed by engagement of the traveller nuts 54a and 54 thereagainst, in their centered positions, whereby the actuators are out of engagement with these contacts and the circuit in which they are incorporated, is deenergized. When the circuit is energized, to signal the driver of off-center positions of the traveller nuts, an indicator bulb 240, mounted on the steering column 150 is lit. When the traveller nuts are in their centered positions, the fact is indicated by non-illumination of the bulb 240.

The indicating bulb circuit, as shown in FIGURE 17, comprises a battery 242, which can be the battery of the tractor A, has a wire 244 leading from one side thereof to the switch contact 236, and a wire 246 leading from its other side to one side of the bulb 240, and having an ammeter 248 incorporated therein. The other side of the bulb 240 is connected by a wire 250 to the switch contact 238. An electric cable 252 leads from the bulb 240 to the tractor-carried switch 238, and an electric cable 254 leads forwardly from the semi-trailer carried switch 238 to a plug 256 on the front of the semi-trailer, into which a connector 253 on the tractor-carried cable can be plugged. When the semi-trailer Bowden wires 82 and 84 are disconnected from the tractor-carried steering assembly 44a, they are secured in retainers 258, on the front of the semi-trailer T.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tractor having a cab and a chassis frame, hitch means mounted on the rear of the chassis frame, a trailer, a drawbar extending forwardly therefrom and secured to the hitch means, said hitch means comprising a tractor-carried steering assembly, said assembly having support means fixed to the tractor chassis frame, a first transverse screw journalled on the frame against endwise movements of the screw, a first traveller nut threaded on the screw, guide means on the support means precluding rotation of the traveller nut on the screw, said traveller nut having a hitch ball and said drawbar having a hitch socket engaged with the ball, and first driver actuated means in the cab for rotating the screw in opposite directions, lock means movably mounted on the support means for retaining engagement with the traveller nut in the centered position thereof, and second driver actuated means in the cab and operatively connected to the lock means, said first means comprising a steering wheel located within the cab and having a rim, and a first member connected at one end to the steering wheel and at its other end to the screw, said steering wheel comprising a stationary steering column on which the steering wheel is journalled, said second means comprising a lever rotatably and pivotally mounted on the steering column, a second member connected at one end to the lever and at its other end to the lock.

2. In combination, a tractor having a cab and a chassis frame, hitch means mounted on the rear of the chassis frame, a trailer, a drawbar extending forwardly therefrom and secured to the hitch means, said hitch means comprising a tractor-carried steering assembly, said assembly having support means fixed to the tractor chassis frame, a first transverse screw journalled on the frame against endwise movements of the screw, a first traveller nut threaded on the screw, guide means on the support means precluding rotation of the traveller nut on the screw, said traveller nut having a hitch ball and said drawbar having a hitch socket engaged with the ball, and first driver actuated means in the cab for rotating the screw in opposite directions, lock means movably mounted on the support means for retaining engagement with the traveller nut in the centered position thereof, and second driver actuated means in the cab and operatively connected to the lock means, said first means comprising a steering wheel located within the cab and having a rim, and a first member connected at one end to the steering wheel and at its other end to the screw, said steering wheel comprising a stationary steering column on which the steering wheel is journalled, said second means comprising a lever rotatably and pivotally mounted on the steering column, a second member connected at one end to the lever and at its other end to the lock, said lever having a free end having a releasable clamp thereon adapted to be clamped around the rim of the steering wheel to prevent rotation of the steering wheel and rotation of the lever, with the traveller nuts in centered positions.

3. In combination, a tractor having a cab and a chassis frame, hitch means mounted on the rear of the chassis frame, a trailer, a drawbar extending forwardly and secured to the hitch means, said hitch means comprising a tractor-carried steering assembly, said assembly having support means fixed to the tractor chassis frame, a first transverse screw journalled on the frame against endwise movements of the screw, a first traveller nut threaded on the screw, guide means on the support means precluding rotation of the traveller nut on the screw, said traveller nut having a hitch ball and said drawbar having a hitch socket engaged with the ball, and first driver actuated means in the cab for rotating the screw in opposite directions, lock means movably mounted on the support means for retaining engagement with the traveller nut in the centered position thereof, and second driver actuated means in the cab and operatively connected to the lock means, said first means comprising a steering wheel located within the cab and having a rim, and a first member connected at one end to the steering wheel and at its other end to the screw, said steering wheel comprising a stationary steering column on which the steering wheel is journalled, said second means comprising a lever rotatably and pivotally mounted on the steering column, a second member connected at one end to the lever and at its other end to the lock, said lever having a free end having a releasable clamp thereon adapted to be clamped around the rim of the steering wheel to prevent rotation of the steering wheel and rotation of the lever, with the traveller nut in centered position, said trailer having transverse axle means having steering knuckles pivoted on its ends, said knuckles having steering arms, drag link means extending between and pivoted at the ends thereof to said arms, said link means having guide means fixed centrally thereto and opening means extending therethrough, guide bar means extending slidably and pivotally through said opening means, a perpendicular stubshaft fixed to the chassis frame or the trailer, a sleeve journalled on the stubshaft, said guide bar means being pivoted to the sleeve, a sectional steering bar having a first section pivoted to said sleeve, and a second section, said second section being pivoted at one end to the other end of the first section, a trailer carried steering assembly mounted on the trailer, said trailer steering assembly comprising a second transverse screw, a second traveller nut threaded on the second screw, said sectional steering bar being operatively connected to said second traveller nut, and said second nut being adapted to be moved from a centered position wherein the trailer wheels are in straight ahead positions to either side of the centered position for turning the wheels to either side, third means for rotating the second screw in opposite directions, a second pivoted lock centrally supported relative to the ends of the screw and adapted to embrace and hold the second traveller nut only in a centered position thereof, fourth means for rotating the second lock between engaged and disengaged positions.

4. In combination, a tractor, a trailer trailing the tractor and having a drawbar, a steering assembly on the tractor, comprising a first transverse screw supported against endwise movement, a first traveller nut threaded on the screw and having a hitch ball to which the drawbar is connected, driver operated means on the tractor for rotating the screw in opposite directions, said trailer having steerable wheels, a trailer-carried steering assembly comprising a second transverse screw supported against endwise movement, a second traveller nut threaded on the second screw, means operatively connecting said first and second screws, and bar means operatively connected to the traveller nut of the trailer-carried steering assembly, and operatively connected to the wheels of the trailer.

5. In combination, a tractor, a trailer trailing the tractor and having a drawbar, a tractor-carried steering assembly on the tractor, comprising a first transverse screw supported against endwise movement, a first traveller nut threaded on the screw and having a hitch ball to which the drawbar is connected, driver operated means on the tractor for rotating the first screw in opposite directions, said trailer having steerable wheels, a trailer-carried steering assembly comprising a second transverse screw supported against endwise movement, a second traveller nut threaded on the screw, trailer wheel turning means operatively connected to the traveller nut of the trailer-carried steering assembly, and means operatively connecting the screw of the tractor-carried steering assembly to the screw of the trailer-carried steering assembly, traveller nut locking means supported on the trailer-carried steering assembly and operatively connected with the driver actuated means of the tractor-carried steering assembly.

6. In combination, a tractor, a trailer trailing the tractor and having a drawbar, a steering assembly on the tractor, comprising a first transverse screw supported against endwise movement a first traveller nut threaded on the screw and having a hitch ball to which the drawbar is connected, driver operated means on the tractor for rotating the screw in opposite directions, said trailer having steerable wheels, a trailer-carried steering assembly comprising a second transverse screw supported against endwise movement, a second traveller nut threaded on the second screw, means operatively connecting said first and second screws, and bar means operatively connected to the traveller nut of the trailer-carried steering assembly and operatively connected to the wheels of the trailer, said second traveller nut of the trailer carried steering assembly having a hitch ball thereon, adapted to be connected to the drawbar of another trailer.

7. In combination, a tractor, a trailing trailing the tractor and having a drawbar, a steering assembly on the tractor, comprising a first transverse screw supported against endwise movement, a first traveller nut threaded on the screw and having a hitch ball to which the drawbar is connected, driver operated means on the tractor for rotating the screw in opposite directions, said trailer having steerable wheels, a trailer-carried steering assembly comprising a second transverse screw supported against endwise movement, a second traveller nut threaded on the second screw, means operatively connecting said first and second screws, and bar means operatively connected to the traveller nut of the trailer-carried steering assembly and operatively connected to the wheels of the trailer, tractor carried electrical signal means for indicating a centered position of the traveller nut of the tractor carried steering assembly, said signal means comprising a switch operated by the traveller nut.

8. In combination, a tractor, a trailer trailing the tractor and having a drawbar, a steering assembly on the tractor, comprising a first transverse screw supported against endwise movement, a first traveller nut threaded on the screw and having a hitch ball to which the drawbar is connected, driver operated means on the tractor for rotating the screw in opposite directions, said trailer having steerable wheels, a trailer-carried steering assembly comprising a second transverse screw supported against endwise movement, a second traveller nut threaded on the second screw, means operatively connecting said first and second screws, and bar means operatively connected to the traveller nut of the trailer-carried steering assembly and operatively connected to the wheels of the trailer, tractor carried electrical signal means for indicating a centered position of the traveller nut of the tractor carried steering assembly, said signal means comprising a switch operated by the traveller nut, and a trailer-carried switch operated by the traveller nut of the trailer-carried steering wheel only in a centered position thereof, and means connecting the two switches in circuit.

References Cited by the Examiner
UNITED STATES PATENTS

| | | | |
|---|---|---|---|
| 1,162,946 | 12/15 | Olson | 280—470 |
| 1,479,215 | 1/24 | Borst | 280—419 |
| 2,743,116 | 4/56 | Morrell | 280—420 |
| 2,890,896 | 6/59 | Hendrickson. | |
| 2,917,323 | 12/59 | Mandekic | 280—470 |
| 3,097,863 | 7/63 | Moore | 280—445 |

FOREIGN PATENTS

| | | |
|---|---|---|
| 62,988 | 3/13 | Switzerland. |
| 812,227 | 8/61 | Germany. |
| 1,203,598 | 8/59 | France. |

A. HARRY LEVY, *Primary Examiner.*

LEO FRIAGLIA, *Examiner.*